US012581154B2

(12) United States Patent
Niu et al.

(10) Patent No.: US 12,581,154 B2
(45) Date of Patent: Mar. 17, 2026

(54) METHOD, DEVICE, STORAGE MEDIUM AND PROGRAM PRODUCT FOR VIDEO INFORMATION DISPLAY

(71) Applicant: Beijing Youzhuju Network Technology Co., Ltd., Beijing (CN)

(72) Inventors: Huizhen Niu, Beijing (CN); Siyi Liu, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/841,352

(22) PCT Filed: Feb. 21, 2023

(86) PCT No.: PCT/CN2023/077440
§ 371 (c)(1),
(2) Date: Aug. 23, 2024

(87) PCT Pub. No.: WO2023/160548
PCT Pub. Date: Aug. 31, 2023

(65) Prior Publication Data
US 2025/0175665 A1 May 29, 2025

(30) Foreign Application Priority Data
Feb. 24, 2022 (CN) ........................ 202210173229.X

(51) Int. Cl.
*H04N 21/431* (2011.01)
*G06F 3/0483* (2013.01)

(52) U.S. Cl.
CPC ....... *H04N 21/4316* (2013.01); *G06F 3/0483* (2013.01)

(58) Field of Classification Search
CPC ........... H04N 21/4316; H04N 21/4722; H04N 21/47815; H04N 21/488; H04N 21/4126;
(Continued)

(56) References Cited

U.S. PATENT DOCUMENTS 9,628,575 B1 * 4/2017 Lewis .................. H04N 21/812
10,104,427 B1 * 10/2018 Zabetian ............ H04N 21/8133
(Continued)

FOREIGN PATENT DOCUMENTS

CN 105117934 A 12/2015
CN 111737565 A 10/2020
(Continued)

OTHER PUBLICATIONS

International Patent Application No. PCT/CN2023/077440; Int'l Written Opinion and Search Report; dated May 15, 2023; 8 pages.
(Continued)

*Primary Examiner* — Fernando Alcon
(74) *Attorney, Agent, or Firm* — BakerHostetler

(57) ABSTRACT

Embodiments of the disclosure provide a method, device, storage medium and program product for video information display. The method comprises: receiving a trigger operation for a comment control in a video playback interface; and in response to the trigger operation, displaying an information display panel, wherein the information display panel displays a first tab and a second tab, the first tab being associated with video comment information of a currently played video, and the second tab being associated with video related object information about the currently played video. Displaying the first and second tabs in the information display panel of the video playback interface, associating the first tab with video comment information about the currently played video, and associating the second tab with video related object information about the currently played video.

18 Claims, 3 Drawing Sheets

(58) Field of Classification Search

CPC ............ H04N 21/4788; H04N 21/8133; G06F 3/0483

See application file for complete search history.

(56) References Cited

U.S. PATENT DOCUMENTS

| | | | | |
|---|---|---|---|---|
| 10,154,319 | B1 * | 12/2018 | Ramakrishnan ....... | H04N 21/84 |
| 10,664,138 | B2 * | 5/2020 | Carney ................. | G06F 3/0484 |
| 11,432,047 | B1 * | 8/2022 | Panchaksharaiah .. | H04L 51/046 |
| 2004/0210824 | A1 * | 10/2004 | Shoff ................. | H04N 21/4332 |
| | | | | 725/135 |
| 2005/0283738 | A1 * | 12/2005 | Beringer .............. | G06F 3/0483 |
| | | | | 715/777 |
| 2006/0230356 | A1 * | 10/2006 | Sauve .................. | G06F 3/0481 |
| | | | | 715/777 |
| 2009/0327947 | A1 * | 12/2009 | Schreiner ............. | G06F 3/0483 |
| | | | | 715/777 |
| 2010/0115450 | A1 * | 5/2010 | Scott .................... | G06F 3/0483 |
| | | | | 715/777 |
| 2011/0307807 | A1 * | 12/2011 | Norby ................... | A63F 13/87 |
| | | | | 715/758 |
| 2012/0036423 | A1 * | 2/2012 | Haynes, II ........... | G06F 3/0483 |
| | | | | 715/230 |
| 2012/0110621 | A1 * | 5/2012 | Gossweiler, III .... | H04N 21/488 |
| | | | | 715/751 |
| 2012/0291059 | A1 * | 11/2012 | Roberts ........... | H04N 21/41407 |
| | | | | 725/25 |
| 2013/0325339 | A1 | 12/2013 | McCarthy | |
| 2014/0068437 | A1 * | 3/2014 | Dedapper .............. | G06Q 30/02 |
| | | | | 715/719 |
| 2014/0172744 | A1 * | 6/2014 | El-Hmayssi ........... | G06Q 50/01 |
| | | | | 705/347 |
| 2014/0282677 | A1 * | 9/2014 | Mantell ................ | H04N 21/435 |
| | | | | 725/23 |
| 2015/0074718 | A1 * | 3/2015 | Moguillansky ...... | H04N 21/482 |
| | | | | 725/40 |
| 2015/0121194 | A1 * | 4/2015 | Patten ................. | G06F 16/9574 |
| | | | | 715/234 |
| 2017/0075528 | A1 * | 3/2017 | Kothari ................. | G06F 3/0482 |
| 2017/0140051 | A1 | 5/2017 | Ball et al. | |
| 2018/0255356 | A1 | 9/2018 | Zhao | |
| 2020/0356228 | A1 * | 11/2020 | Carney ................ | H04N 21/482 |
| 2020/0379636 | A1 * | 12/2020 | Takasawa .............. | G11B 27/28 |
| 2021/0158371 | A1 | 5/2021 | Dhotey et al. | |
| 2021/0350906 | A1 * | 11/2021 | Janicki .................. | G06F 3/0483 |
| 2021/0383252 | A1 * | 12/2021 | Arnold .................. | G06F 3/0483 |
| 2022/0107712 | A1 * | 4/2022 | Mattox, Jr. ............ | G06F 9/451 |
| 2022/0391080 | A1 * | 12/2022 | Markiewicz ............ | G06F 9/451 |
| 2023/0199126 | A1 * | 6/2023 | Sato ...................... | G06F 3/0486 |
| | | | | 358/1.15 |

FOREIGN PATENT DOCUMENTS

| | | |
|---|---|---|
| CN | 112070569 A | 12/2020 |
| CN | 112256166 A | 1/2021 |
| CN | 112395022 A | 2/2021 |
| CN | 112866759 A | 5/2021 |
| CN | 113055707 A | 6/2021 |
| CN | 113515663 A | 10/2021 |
| CN | 113536136 A | 10/2021 |
| CN | 113691853 A | 11/2021 |
| CN | 113961121 A | 1/2022 |
| CN | 113973223 A | 1/2022 |
| CN | 114554260 A | 5/2022 |
| JP | 2014-216929 A | 11/2014 |
| JP | 2015-231208 A | 12/2015 |
| JP | 2017-228943 A | 12/2017 |
| JP | 2022-027635 A | 2/2022 |
| KR | 2010-0031595 A | 3/2010 |
| KR | 20200135687 A | 12/2020 |
| TW | 201407562 A | 2/2016 |

OTHER PUBLICATIONS

China Patent Application No. 202210173229.X; Office Action; dated Apr. 27, 2023; 30 pages.

Japanese Patent Application No. 2024-550573; Office Action dated Feb. 18, 2025, 6 pages with machine translation.

European Patent Application No. 23759173.0; Extended European Search Report dated Mar. 31, 2025, 6 pages.

China Patent Application No. 202210173229.X; Notification to Grant; dated Nov. 14, 2024; 6 pages.

Japanese Patent Application No. 2024-550573; Decision to Grant a Patent dated Jun. 24, 2025, 5 pages with machine translation.

* cited by examiner

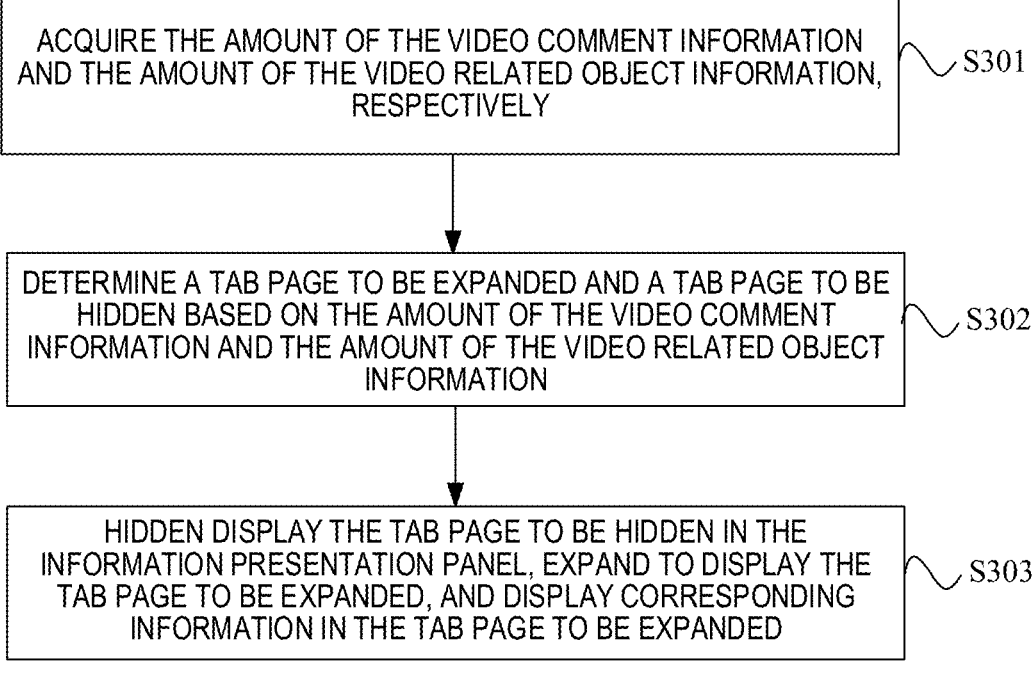

ACQUIRE THE AMOUNT OF THE VIDEO COMMENT INFORMATION AND THE AMOUNT OF THE VIDEO RELATED OBJECT INFORMATION, RESPECTIVELY — S301

DETERMINE A TAB PAGE TO BE EXPANDED AND A TAB PAGE TO BE HIDDEN BASED ON THE AMOUNT OF THE VIDEO COMMENT INFORMATION AND THE AMOUNT OF THE VIDEO RELATED OBJECT INFORMATION — S302

HIDDEN DISPLAY THE TAB PAGE TO BE HIDDEN IN THE INFORMATION PRESENTATION PANEL, EXPAND TO DISPLAY THE TAB PAGE TO BE EXPANDED, AND DISPLAY CORRESPONDING INFORMATION IN THE TAB PAGE TO BE EXPANDED — S303

FIG. 3

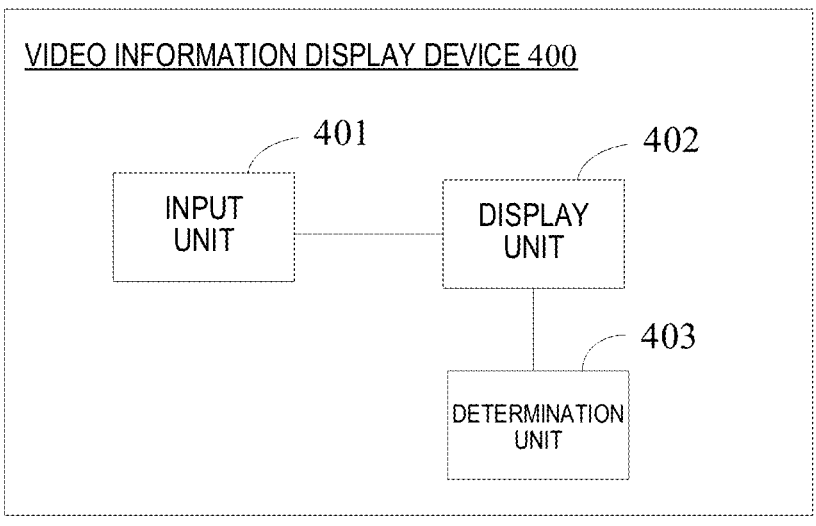

VIDEO INFORMATION DISPLAY DEVICE 400

401

INPUT UNIT

402

DISPLAY UNIT

403

DETERMINATION UNIT

FIG. 4

METHOD, DEVICE, STORAGE MEDIUM AND PROGRAM PRODUCT FOR VIDEO INFORMATION DISPLAY

CROSS REFERENCE TO RELATED APPLICATIONS

This application is the U.S. National Stage of International Application No. PCT/CN2023/077440, filed on Feb. 21, 2023, which claims priority to Chinese Patent Application No. 202210173229. X, filed with the Chinese Patent Office on Feb. 24, 2022, and entitled "METHOD, DEVICE, STORAGE MEDIUM, AND PROGRAM PRODUCT FOR VIDEO INFORMATION DISPLAY", which [is] are incorporated herein by reference in their entireties.

FIELD

Embodiments of the present disclosure relate to the field of computer and network communications technologies, and in particular, to a method, a device, a storage medium and a program product for video information display.

BACKGROUND

With the development of video technologies, a video in a video platform may be associated with some objects, for example, associated with commodities. It is convenient for a user to shop while watching the video.

SUMMARY

Embodiments of the present disclosure provide a method, a device, a storage medium and a program product for video information display, so that a user views video comment information and video related object information in a video viewing process, thereby simplifying user operations.

In a first aspect, an embodiment of the present disclosure provides a method for video information display, including:

receiving a trigger operation for a comment control in a video playback interface; and in response to the trigger operation, displaying an information display panel, wherein the information display panel displays a first tab and a second tab, the first tab being associated with video comment information of a currently played video, and the second tab being associated with video related object information about the currently played video.

In a second aspect, an embodiment of the present disclosure provides a device for video information display, including:

an input unit configured for receiving a trigger operation for a comment control in a video playback interface; and a display unit configured for in response to the trigger operation, displaying an information display panel, wherein the information display panel displays a first tab and a second tab, the first tab being associated with video comment information of a currently played video, and the second tab being associated with video related object information about the currently played video.

In a third aspect, an embodiment of the present disclosure provides an electronic device, including: at least one processor and a memory;

the memory stores a computer execution instruction;

when the computer execution instructions stored in the memory being executed by the at least one processor, causing the at least one processor to execute the method according to the first aspect and various possible designs of the first aspect.

In a fourth aspect, an embodiment of the present disclosure provides a computer readable storage medium. The computer readable storage medium stores a computer execution instruction. When a processor executes the computer execution instruction, the video information display method according to the first aspect and various possible designs of the first aspect is implemented.

In a fifth aspect, an embodiment of the present disclosure provides a computer program product, including a computer program. When being executed by a processor, the computer program implements the video information display method according to the first aspect and various possible designs of the first aspect.

In a sixth aspect, an embodiment of the present disclosure provides a computer program. When being executed by a processor, the computer program implements the video information display method according to the first aspect and various possible designs of the first aspect.

BRIEF DESCRIPTION OF THE DRAWINGS

To describe the technical solutions in embodiments of the present disclosure or in the prior art more clearly, the following briefly introduces the accompanying drawings required for describing embodiments or the prior art. Apparently, the accompanying drawings in the following description show some embodiments of the present disclosure. For those skilled in the art, without creative labor, other related drawings can be obtained based on these drawings.

FIG. 3 is a schematic flowchart of a method for video information display according to another embodiment of the present disclosure;

FIG. 4 is a structural block diagram of a video information display device according to an embodiment of the present disclosure.

DETAILED DESCRIPTION

In order to make the purpose, technical solutions, and advantages of the embodiments of the present disclosure clearer, the technical solutions in the embodiments of the present disclosure will be described clearly and completely in conjunction with the accompanying drawings below. Apparently, the described embodiments are only part of the embodiments of the present disclosure, not all of them. Based on the embodiments of the present disclosure, all other embodiments obtained by those skilled in the art without creative labor belong to the scope of protection of the present disclosure.

With the development of video technologies, a video in a video platform may be associated with some objects, for example, associated with commodities. It is convenient for a user to shop while watching the video.

When a user watches a video, if the user needs to know detailed information about a video related object, the user needs to jump to a page of the video related object. The detailed information about the video-related object is viewed in the page jumped to. For example, the user needs to view commodity evaluation of the video-related commodity, the merchandise link needs to be opened, and the merchandise evaluation included in the page corresponding to the merchandise link is found and viewed. The operation is inconvenient, which affects the user experience.

In order to solve the described technical problem, embodiments of the present disclosure provide a method for video information display. The method comprises: receiving a trigger operation for a comment control in a video playback interface; and in response to the trigger operation, displaying an information display panel, wherein the information display panel displays a first tab and a second tab, the first tab being associated with video comment information of a currently played video, and the second tab being associated with video related object information about the currently played video. In embodiments of the present disclosure, a first tab and a second tab are displayed in an information display panel of a video playback interface, associating a first tab with video comment information about a currently played video, and associating a second tab with video related object information about the currently played video. It is convenient for the user to view the video comment information and the video related object information in the process of watching the video. It is unnecessary to jump to a page of a video related object to view information about the video related object, thereby simplifying user operations. Thus, the user experience is improved.

Figure 1:
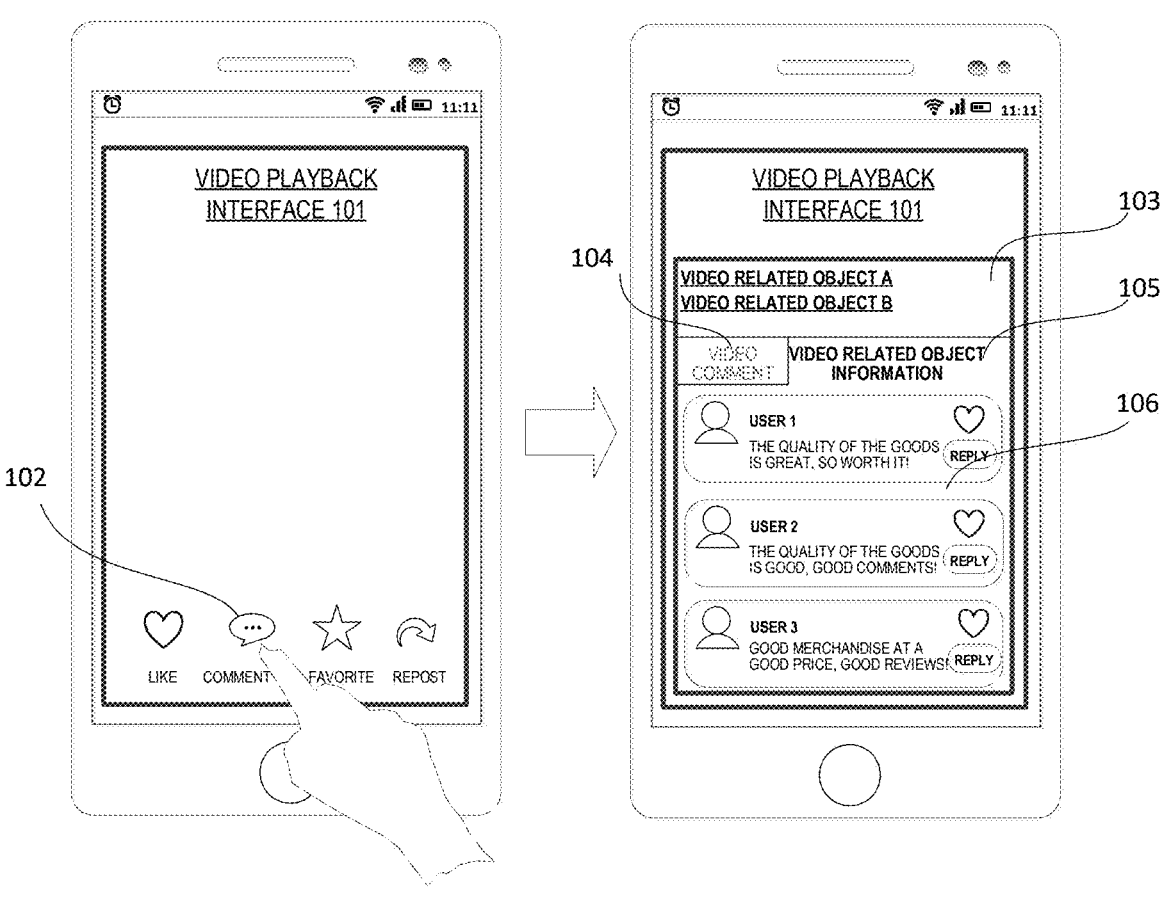
FIG. 1 is an example diagram of an interface of a method for video information display according to an embodiment of the present disclosure.

As shown in FIG. 1, a video information display method according to an embodiment of the present disclosure is provided with a trigger button 102 for a comment control in a video playback interface 101. A user triggers a comment control by means of the trigger button 102, and an information display panel 103 is displayed in a video playback interface 101. The information display panel 103 displays a first tab 104 and a second tab 105, and each tab corresponds to a tab page. As shown in FIG. 1, a tab page 106 corresponding to the second tab 105 is displayed in an expanded manner, so that different tab pages are used to present the video comment information and the video related object information. In FIG. 1, the tab 106 corresponding to the second tab 105 is expanded, and a plurality of pieces of video related object information are displayed (for the case that the video related object is a commodity, the video related object information may be commodity evaluation information), while the tab page corresponding to the first tab 104 is hidden. If the user switches the tab, for example, the tab corresponding to the second tab is switched to the tab corresponding to the first tab, the tab page corresponding to the second tab 105 may be hidden, the tab page corresponding to the first tab 104 may be expanded, and the video comment information is displayed in the tab page corresponding to the first tab 104.

The method according to embodiments of the present disclosure will be described in detail below with reference to specific embodiments.

Figure 2:
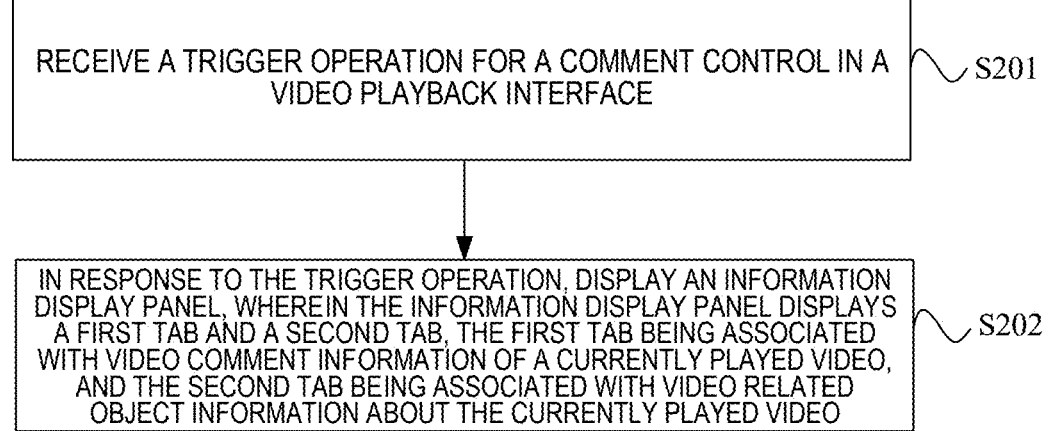
FIG. 2 is a schematic flowchart of a method for video information display according to an embodiment of the present disclosure.

Referring to FIG. 2, FIG. 2 is a first schematic flowchart of a method for displaying video information according to an embodiment of the present disclosure. The method in this embodiment may be applied to a terminal device or a server. The video information display method includes:

S201, a trigger operation for a comment control in a video playback interface is received.

S202, in response to the trigger operation, an information display panel is displayed. The information display panel displays a first tab and a second tab, the first tab being associated with video comment information of a currently played video, and the second tab being associated with video related object information about the currently played video.

In this embodiment, a comment control is included in a video playback interface, and a user may trigger the comment control. For example, by clicking a button of the comment control, an information display panel corresponding to the comment control may be displayed in the video playback interface.

In this embodiment, if a video related object exists in a video currently played in a video playback interface, a first tab and a second tab may be displayed in the information presentation interface. The first tab is associated with video comment information about a currently played video, and the second tab is associated with video related object information about the currently played video. The first tab and the second tab may be different types of tabs. The tabs are interactable identifications (for example, interactable buttons), different types of information are associated respectively, in which the association may specifically be a specific correlation between different types of tabs and different types of information, so as to display information of a corresponding type when the tab is triggered.

By way of example, in an optional embodiment, a video-related object may be an object involved in a video, and may also be an object associated with the video. The video related object information may be information related to an object involved in the currently played video, for example, evaluation information of a user for the object in the video. The video comment information may be comment information of a user regarding a video, for example, comment information of the user regarding the video itself except the video related object information. For some marketing videos (such as live commerce videos and product introduction videos), the video-related objects may be products. The information display interface may present an object identification of the video related object, such as a video-associated merchandise link anchor, a shopping cart, and a merchandise thumbnail. The video related object information may be commodity information, including but not limited to commodity evaluation information and/or commodity attribute information. The commodity evaluation information is an evaluation text, a picture, a video, or the like for a commodity of a purchased user, and may further comprise an evaluation time. Clicking picture and video may enter a large picture mode for viewing. Sliding switching a plurality of pictures is supported. Commodity attribute information includes, but is not limited to, a commodity name, price information, brand information, the number of sold goods, commodity introduction information, etc. It is convenient for a user to quickly learn commodities during a video viewing process, thereby improving interaction experience.

Compared with triggering a comment control to expand a comment panel, the comment panel displays video comment information. The present disclosure displays an information display panel, wherein a first tab and a second tab are displayed on the information display panel. The first tab is associated with video comment information about a currently played video, and the second tab is associated with video related object information about the currently played video, thereby facilitating a user in rapidly viewing multi-dimensional information related to the video. It may be beneficial for the user to switch to view information of different dimensions as required.

In another optional embodiment, for some theatrical videos, the video related objects may also be actors in the videos. The video related object information may be actor information, and the information display interface may present an object identification of the video related object, for example, an avatar identification of an actor and a brief-introduction link anchor of the actor, so that a user can know actor information in a video watching process, improving the interaction experience in a broadcasting process.

In this embodiment, after a user triggers the comment control, video comment information and video related object information of a video being played may be acquired. The video related object information may be acquired from a page of the video related object in real time, or may be acquired in advance and stored in the server in association with the currently played video, and then the video related object information is requested from the server, or the video related object information is obtained by other means, which is not limited herein.

Further, when the information display panel is displayed in the video playback interface, a first tab and a second tab are displayed on the information display panel. The first tab is associated with video comment information about the video currently played, and the second tab is associated with video related object information about the video currently played.

More specifically, each tab corresponds to a tab page. The tab page corresponding to the first tab is used for displaying video comment information about a currently played video, and the tab page corresponding to the second tab is used for displaying video related object information about the currently played video. That is, in this embodiment, the video comment information and the video related object information may be displayed in different tab pages respectively, so that a user can view video comment information and video related object information in an information display panel in a video playback interface. Especially, for viewing the information about the video related object, it is unnecessary to jump to the page of the video related object to view the detailed information about the video related object. This simplifies the operation and improves the user experience.

It should be noted that, because a video related object may exist in the currently played video, and a video related object may also not exist, in the case where a video related object exists, the video comment information and the video related object information may be displayed in different tab pages of the information display panel, respectively. That is, if it is determined that a video related object exists in a currently played video, a second tab is displayed in the information display panel. For a case in which no video related object exists, it is only required to present the video comment information in the information display panel. That is, if it is determined that there is no video related object in a currently played video, there is no need to acquire video related object information and display same in different tab pages. Therefore, in order to distinguish the foregoing two cases, it is unnecessary to display the second tab in the information display panel. After the user triggers the comment control and before the information display panel is displayed in the video playback interface, it may further determine whether a video related object exists in the currently played video.

The video information display method provided in embodiments of the present disclosure comprises: receiving a trigger operation for a comment control in a video playback interface; and in response to the trigger operation, displaying an information display panel, wherein the information display panel displays a first tab and a second tab, the first tab being associated with video comment information of a currently played video, and the second tab being associated with video related object information about the currently played video. In this embodiment, the first tab and the second tab are displayed in the information display panel of the video playback interface, the first tab being associated with video comment information about the currently played video, and the second tab being associated with video related object information about the currently played video. It is convenient for the user to view the video comment information and the video related object information in the process of watching the video. It is unnecessary to jump to a page of a video related object to view information about the video related object, thereby simplifying user operations. Thus, the user experience is improved.

In an optional embodiment, the information display panel displays video comment information of the currently played video or video related object information of the currently played video, and a tab associated with the displayed video comment information or video related object information is in a highlighted state.

In this embodiment, when an information display panel is displayed, video comment information about the currently played video or video related object information about the currently played video may be displayed in the information display panel. If the video comment information about the currently played video is displayed in the information display panel, a tab associated with the displayed video comment information is in a highlighted state, for example, in a selected state. If the information about the video related object of the currently played video is displayed in the information display panel, the tab associated with the information about the video related object of the currently played video that is displayed is in a highlighted state, for example, in a selected state. The display effect of the selected state is different from that of an unselected state, so as to facilitate an interactive operation of a user.

In an optional embodiment, when information is displayed in a tab page manner, a first tab and a second tab respectively correspond to tab pages. The tabs, the corresponding tab pages, and information displayed on the tab page have association/correlation for linkage display. The information display panel has a limited display area, and therefore, one tab page needs to be expanded so as to hide other tab pages. Thus, the display space is saved, and the switching adjustment may be flexibly performed based on the watching requirement of the user. Further, the display information display panel in S202 of the above embodiment may specifically include:

hiding a non-default tab page in the information display panel, expanding a default tab page, and displaying corresponding information in the default tab page. The default tab page is a tab page corresponding to the video comment information or a tab page corresponding to the video related object information.

In this embodiment, a default tab page may be set as an expanded tab page and a non-default tab page may be hidden. The default tab page may be a tab page corresponding to video comment information or a tab page corresponding to video related object information. For example, if the tab page corresponding to the video related object information is set as the default tab page, after the user triggers the comment control, the tab page corresponding to the video related object information is directly expanded in the information display panel, and other tab page is hidden by folding.

In another optional embodiment, as shown in FIG. 3, the displaying the video comment information and the video related object information separately on different tab pages in S202 of the foregoing embodiment may specifically include:

> S301: the amount of the video comment information and the amount of the video related object information are obtained, respectively;
>
> S302, a tab page to be expanded and a tab page to be hidden are determined based on the amount of the video comment information and the amount of the video related object information, a tab page being a page corresponding to the first tab or the second tab in the information display panel;
>
> S303: the tab page to be hidden is hidden displayed in the information presentation panel, the tab page to be expanded is expanded to display, and corresponding information in the tab page to be expanded is displayed.

In this embodiment, a tab page to be expanded and a tab page to be hidden may be determined based on the number of pieces of video comment information and the number of pieces of video related object information. The number of pieces of video comment information is also the number of pieces of video comments. The number of pieces of video related object information is, for example, the number of pieces of commodity evaluation. In addition, after the user triggers the comment control, the to-be-hidden tab page is hidden in the information display panel, and the to-be-expanded tab page is expanded. The corresponding information is information corresponding to the tab page to be expanded, for example, the tab page to be expanded is an evaluation page (a tab page corresponding to video related object information) of a commodity associated with a video, and the corresponding information is commodity evaluation information (video related object information). The to-be-expanded tab page is a video comment page (a tab page corresponding to video comment information), and the corresponding information is video comment information.

Optionally, one tab page with a large amount of information may be used as the tab page to be expanded. For example, if the amount of video comment information is large, the tab page corresponding to the video comment information is determined as the tab page to be expanded, and other tab pages are tab pages to be hidden.

Optionally, if the quantity of one of the video comment information and the video related object information is 0, the tab page corresponding to the quantity of 0 is determined as the tab page to be hidden, and the tab corresponding to the other information is determined as the tab page to be expanded. For example, if the quantity of video comment information is 0, the tab page corresponding to the video comment information is determined as the tab page to be hidden, and the tab page corresponding to video related object information whose quantity is not 0 is determined as the tab page to be expanded. Otherwise, if the number of pieces of video related object information is 0, the tab page corresponding to the video related object information is determined as the tab page to be hidden, and the tab page corresponding to the video comment information, the number of which is not 0, is determined as the tab page to be expanded. Optionally, if the quantities are all 0, expansion may be performed based on a default tab page, and a non-default tab page is folded.

Optionally, the number of pieces of video comment information and the number of pieces of video related object information may be displayed in a tab of a corresponding tab page.

On the basis of any one of the foregoing embodiments, one tab page is expanded in the information display panel, other tab page is hidden. If a user wants to view information in the hidden tab page, a tab page switching operation may be triggered. For example, a tab of a hidden tab page is clicked, or tab page switching is triggered by a sliding operation. To respond to a tab page switching operation, the currently opened tab page is hidden, and one or more tab pages of the currently hidden tab pages are expanded. Optionally, each switching operation may hide the currently expanded tab page, and expand a designated or adjacent tab page that is currently hidden.

On the basis of any one of the foregoing embodiments, there may be a plurality of video-related objects of the currently played video, and object identifications of the plurality of video-related objects may be displayed in an information display panel. For example, if the currently played video is associated with a plurality of commodities, identifications of the plurality of commodities are displayed in the information display panel, for example, pictures and/or names of the commodities are displayed.

Further, the user may trigger an object identification of a certain target video related object, for example, clicking an object identification of a certain target video related object. In response to the triggering operation on the object identification of the target video related object, target video related object information is displayed in the information display panel. The target video related object may be any video related object among the video related objects of the currently played video. For example, if a plurality of commodities are associated with a video being played currently, a commodity evaluation is displayed in a tab page corresponding to the video related object information. If a user triggers an identification of a certain target commodity, a commodity evaluation of the target commodity is selected and displayed in the tab page corresponding to the video related object information, so that the user only views the commodity evaluation of the target commodity.

On the basis of any one of the foregoing embodiments, similar to a function that the video comment information in the information display panel may make a like and reply, in this embodiment, a like and reply function may also be provided in the tab page corresponding to the video related object information.

Optionally, a like button is further included in a display area of each piece of video related object information in the tab page corresponding to the video related object information. In response to a trigger operation on the like button, the like button may be highlighted, and the cumulative number of likes of the video related object information is updated and displayed in the display area of the video related object information. If the like button is not clicked, the like button may be gray, and a text is not displayed. If the like button is clicked, the like button is highlighted, and the corresponding number of likes may be displayed.

Further, after the video related object information is liked, the video related object information may be sent to a client of a poster of the video related object information.

Optionally, a reply button is further included in a display area of each piece of video related object information in the tab page corresponding to the video related object information. In response to an operation of triggering the reply button, an input box is displayed. In response to an operation of a user inputting reply content in the input box and submitting it, the reply content may be displayed in the display area of the associated video object information, for example, displayed below the associated video object information. If a plurality of pieces of reply content exist, a part of the reply content may be hidden.

Further, after the video related object information is responded to, reply prompt information is sent to a client of a poster of the video related object information, which includes reply content, so that the poster of the video related object information replies to the reply content. Further, the reply content of the poster of the video related object information is also displayed in a display area of the video related object information.

On the basis of any one of the foregoing embodiments, the tab page of the video related object information may further comprise the release time of each piece of video related object information. Taking a commodity evaluation as an example, optionally, within the evaluation time day T, minutes time interval from the current minute within 1 h is displayed (for example, writing evaluation at 11:20, opening the tab page at 11:30, and "before 10 minutes" is displayed). The current small time interval from 1 h on day T to 1 h away on day T (for example, writing evaluation at 11:00, opening a tab page at 12:00, and "1 hour ago" is displayed). Day T to day T-2: show specific time of yesterday (e. g., writing evaluation day at 11:20 yesterday, opening the tab page at 10:00 today, "11:20 yesterday" is displayed (24 hours mode). The current number of days from T-3 is displayed (for example, day 11/18 for evaluation, day 11/19 for opening the tab page, and "1 day ago" is displayed). Specific dates are shown outside T-3 (e. g., day 11/10 for evaluation, 10:00 for today to open a tab page, "11-10" is displayed).

Corresponding to the method for displaying video information in the above embodiments, FIG. 4 is a block diagram of a structure of a device for displaying video information provided in an embodiment of the present disclosure. For ease of description, only parts related to embodiments of the present disclosure are shown. Referring to FIG. 4, a video information display device 400 includes an input unit 401 and a display unit 402.

The input unit 401 is configured to a trigger operation for a comment control in a video playback interface.

The display unit 402 is configured to in response to the trigger operation, display an information display panel, wherein the information display panel displays a first tab and a second tab, the first tab being associated with video comment information of a currently played video, and the second tab being associated with video related object information about the currently played video.

In one or more embodiments of the present disclosure, the information display panel displays the video comment information of the currently played video or the video related object information of the currently played video, the tab associated with the displayed video comment information or video related object information being in a highlighted state.

In one or more embodiments of the present disclosure, display unit 402, when displaying the information display panel, is configured for:
acquiring the amount of the video comment information and the amount of the video related object information, respectively;
determining a tab page to be expanded and a tab page to be hidden based on the amount of the video comment information and the amount of the video related object information, wherein a tab page is a page corresponding to the first tab or the second tab in the information display panel; and
hidden displaying the tab page to be hidden in the information presentation panel, expanding to display the tab page to be expanded, and displaying corresponding information in the tab page to be expanded.

In one or more embodiments of the present disclosure, when determining the tab page to be expanded and the tab page to be hidden based on the amount of the video comment information and the amount of the video related object information, the displaying unit 402 is configured for:
in response to one of the amount of the video comment information and the amount of the video related object information is 0, determining the tab page corresponding to the information of which the amount is 0 as the tab page to be hidden, and determining the tab page corresponding to the other information as the tab to be expanded.

In one or more embodiments of the present disclosure, the display unit 402 is further configured for:
in response to a tab page switching operation, hiding a currently opened tab page, and opening one or more tab pages of currently hidden tab pages.

In one or more embodiments of the present disclosure, the displaying unit 402 is further configured for:
in response to a plurality of video related objects exist, displaying object identifications of the plurality of video related objects in the information display panel; and
in response to a triggering operation on an object identification of a target video related object, displaying the target video related object information in the information display panel.

In one or more embodiments of the present disclosure, the device further includes:
a determination unit 403, configured for determining whether a video related object exists in the currently played video.

The displaying unit 402 is further configured for in accordance with a determination that the video related object exists in the currently played video, displaying the second tab in the information display panel.

The video information display device provided in this embodiment may be used to execute the technical solutions of the foregoing method embodiments. The implementation principles and technical effects are similar, and are not repeatedly described herein in this embodiment.

Figure 5:
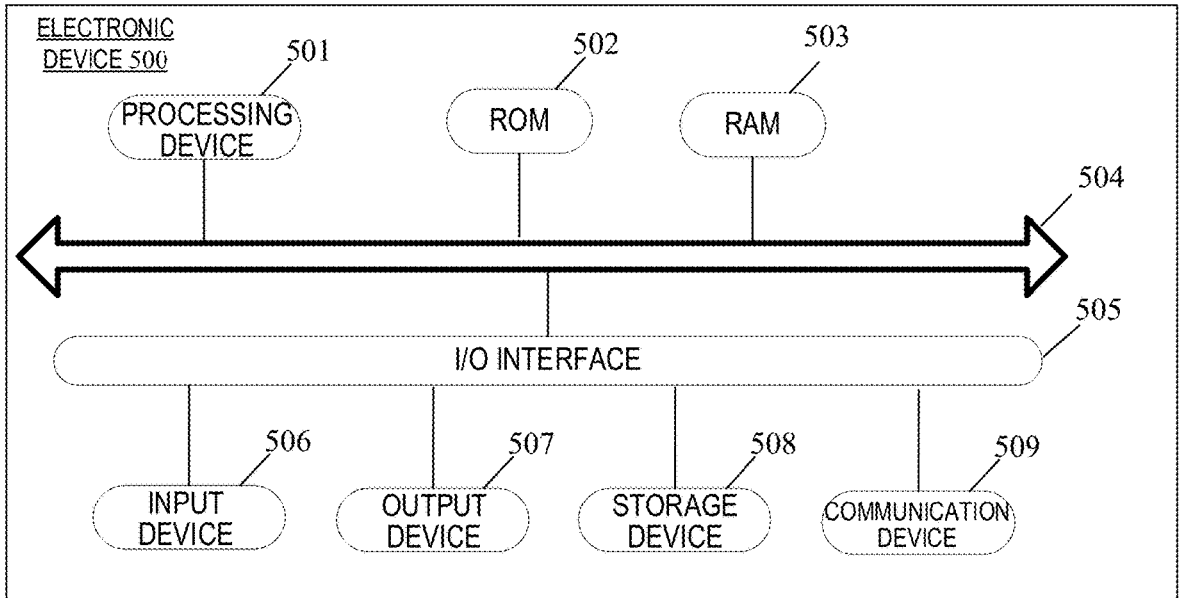
FIG. 5 is a schematic diagram of a hardware structure of an electronic device according to an embodiment of the present disclosure.

Referring to FIG. 5, it shows a schematic structural diagram of an electronic device 500 suitable for implementing an embodiment of the present disclosure. The electronic device 500 may be a terminal device or a server. The terminal device may include, but is not limited to, mobile terminals such as a mobile phone, a notebook computer, a digital broadcast receiver, a personal digital assistant (PDA), a PAD (tablet computer), a portable media player (PMP) and a vehicle-mounted terminal (for example, a vehicle-mounted navigation terminal), and fixed terminals such as a digital television (TV) and a desktop computer. The electronic device shown in FIG. 5 is merely an example, and should not impose any limitation to the function or the scope of application of the embodiments of the present disclosure.

As shown in FIG. 5, electronic device 500 may include a processing device (such as a central processing unit and a graphics processor) 501, which may execute various appropriate actions and processing according to a program stored in a read-only memory (ROM) 502 or a program loaded to a random access memory (RAM) 503 from a storage device 508. Various programs and data required during operation of the electronic device 500 are also stored in the RAM 503. The processing device 501, the ROM 502 and the RAM 503 are connected with one another via a bus 504. An input/output (I/O) interface 505 is also connected to the bus 504.

Generally, the following devices may be connected to the I/O interface 505: an input device 506 including for example a touch screen, a touch pad, a keyboard, a mouse, a camera, a microphone, an accelerometer and a gyroscope; an output device 507 including for example a liquid crystal display (LCD), a speaker and a vibrator; a storage device 508 including for example a magnetic tape and a hard disk; and a communication device 509. The communication device 509 may allow wireless or wired communication between the electronic device 500 and other devices for data exchange. Although FIG. 5 shows the electronic device 500 having various devices, it should be understood that not all the devices shown are necessarily required to be implemented or provided. More or fewer devices may alternatively be implemented or provided.

In particular, according to the embodiments of the present disclosure, the process described above with reference to the flowcharts may be implemented as a computer software program. For example, an embodiment of the present disclosure provides a computer program product including a computer program carried on a non-transient computer-readable medium. The computer program includes a program code for executing the methods shown in the flowcharts. In such an embodiment, the computer program may be downloaded and installed from the network via the communication device 509, or installed from the storage device 508, or installed from the ROM 502. The computer program, when executed by the processing unit 501, causes the processing unit to execute the above functions defined in the methods according to the embodiments of the present disclosure.

It should be noted that the computer-readable medium according to the present disclosure may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus, or device, or any combination thereof. More specific examples of the computer-readable storage medium include but are not limited to: an electrical connection with at least one wire, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that contains or stores a program. The program may be used by or used in combination with an instruction execution system, apparatus, or device. However, in the present disclosure, the computer-readable signal medium may include a data signal propagated in baseband or as a part of a carrier wave, and computer-readable program code is carried therein. This propagated data signal may take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program used by or used in combination with the instruction execution system, apparatus, or device. The program code contained on the computer-readable medium may be transmitted by any suitable medium, including but not limited to, wire, optical cable, RF, etc., or any suitable combination thereof.

The computer readable medium may be included in the electronic device, or may exist separately and not be installed in the electronic device.

The computer readable medium carries one or more programs, and when the one or more programs are executed by the electronic device, causes the electronic device to implement the method of the above embodiments.

The computer program code for performing the operations of the present disclosure may be written in one or more programming languages or a combination thereof, which include but are not limited to object-oriented programming languages Java, Smalltalk, C++, and conventional procedural programming languages such as "C" or similar programming languages. The program codes may be executed completely on a user computer, partially on a user computer, as an independent package, partially on a user computer and partially on a remote computer, or completely on a remote computer or server. In cases involving a remote computer, the remote computer may be connected to a user computer through any type of network, including a local area network (LAN) or a wide area network (WAN), or may be connected to an external computer (for example, through the Internet by using an Internet service provider).

The flowcharts and the block diagrams in the drawings illustrate system architectures, functions and operations that may be implemented based on the system, method and computer program product according to various embodiments of the present disclosure. In this regard, each block in the flowcharts or the block diagrams can represent one module, a program segment or a part of a code, and the module, the program segment or the part of the code includes at least one executable instruction for implementing specific logic functions. It should also be noted that, in some alternative implementations, the functions noted in the blocks may also occur in a sequence different from those illustrated in the drawings. For example, two consecutive blocks may be executed substantially in parallel, and may sometimes be executed in an opposite order, depending on the functions involved. It should also be noted that each block in the block diagrams and/or the flowcharts, and combinations of the blocks in the block diagrams and/or the flowcharts can be implemented in a dedicated hardware-based system that performs the specified functions or operations, or can be implemented by the combination of dedicated hardware and computer instructions.

The modules described in the embodiments of the present disclosure may be implemented by way of software or hardware. In some cases, the names of the modules do not constitute limitations to the modules themselves. For example, the first obtaining unit may also be described as "a unit for obtaining at least two Internet protocol addressed".

The functions described above herein may be at least partially performed by one or more hardware logic components. For example, non-restrictively, example types of hardware logic components that may be used include: a field programmable gate array (FPGA), an application-specific integrated circuit (ASIC), an application-specific standard parts (ASSP), a system-on-chip (SOC), a complex programmable logic device (CPLD), and the like.

In the context of the present disclosure, the machine-readable medium may be a tangible medium that may contain or store a program used by or used in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination thereof.

In a first aspect, according to one or more embodiments of the present disclosure, a method for video information display is provided, including:

receiving a trigger operation for a comment control in a video playback interface; and in response to the trigger operation, displaying an information display panel, wherein the information display panel displays a first tab and a second tab, the first tab being associated with video comment information of a currently played video, and the second tab being associated with video related object information about the currently played video.

According to one or more embodiments of the present disclosure, the information display panel displays the video comment information of the currently played video or the video related object information of the currently played video, the tab associated with the displayed video comment information or video related object information being in a highlighted state.

According to one or more embodiments of the present disclosure, the method further comprises:

acquiring the amount of the video comment information and the amount of the video related object information, respectively;

determining a tab page to be expanded and a tab page to be hidden based on the amount of the video comment information and the amount of the video related object information, wherein a tab page is a page corresponding to the first tab or the second tab in the information display panel; and hidden displaying the tab page to be hidden in the information presentation panel, expanding to display the tab page to be expanded, and displaying corresponding information in the tab page to be expanded.

According to one or more embodiments of the present disclosure, the determining a tab page to be expanded and a tab page to be hidden based on the amount of the video comment information and the amount of the video related object information comprises:

in response to one of the amount of the video comment information and the amount of the video related object information is 0, determining the tab page corresponding to the information of which the amount is 0 as the tab page to be hidden, and determining the tab page corresponding to the other information as the tab to be expanded.

According to one or more embodiments of the present disclosure, the method further comprises:

in response to a tab page switching operation, hiding a currently opened tab page, and opening one or more tab pages of currently hidden tab pages.

According to one or more embodiments of the present disclosure, the method further comprises:

in response to a plurality of video related objects exist, displaying object identifications of the plurality of video related objects in the information display panel; and in response to a triggering operation on an object identification of a target video related object, displaying the target video related object information in the information display panel.

According to one or more embodiments of the present disclosure, the method further comprises:

determining whether a video related object exists in the currently played video; and in accordance with a determination that the video related object exists in the currently played video, displaying the second tab in the information display panel.

In a second aspect, according to one or more embodiments of the present disclosure, a device for video information display is provided, including:

an input unit configured for receiving a trigger operation for a comment control in a video playback interface; and a display unit configured for in response to the trigger operation, displaying an information display panel, wherein the information display panel displays a first tab and a second tab, the first tab being associated with video comment information of a currently played video, and the second tab being associated with video related object information about the currently played video.

According to one or more embodiments of the present disclosure, the information display panel displays the video comment information of the currently played video or the video related object information of the currently played video, the tab associated with the displayed video comment information or video related object information being in a highlighted state.

According to one or more embodiments of the present disclosure, when the display unit displays the information display panel, the display unit is configured for:

acquiring the amount of the video comment information and the amount of the video related object information, respectively;

determining a tab page to be expanded and a tab page to be hidden based on the amount of the video comment information and the amount of the video related object information, wherein a tab page is a page corresponding to the first tab or the second tab in the information display panel; and hidden displaying the tab page to be hidden in the information presentation panel, expanding to display the tab page to be expanded, and displaying corresponding information in the tab page to be expanded.

According to one or more embodiments of the present disclosure, when determining the to-be-extended tab page and the to-be-hidden tab page based on the amount of the video comment information and the amount of the video related object information, the display unit is configured for:

in response to one of the amount of the video comment information and the amount of the video related object information is 0, determining the tab page corresponding to the information of which the amount is 0 as the tab page to be hidden, and determining the tab page corresponding to the other information as the tab to be expanded.

According to one or more embodiments of the present disclosure, the display unit is further used for:

in response to a tab page switching operation, hiding a currently opened tab page, and opening one or more tab pages of currently hidden tab pages.

According to one or more embodiments of the present disclosure, the display unit is further configured for:

in response to a plurality of video related objects exist, displaying object identifications of the plurality of video related objects in the information display panel; and in response to a triggering operation on an object identification of a target video related object, displaying the target video related object information in the information display panel.

According to one or more embodiments of the present disclosure, the device further comprises:

a determination unit for determining whether a video related object exists in the currently played video.

The displaying unit is further configured for in accordance with a determination that the video related object exists in the currently played video, displaying the second tab in the information display panel.

In a third aspect, according to one or more embodiments of the present disclosure, there is provided an electronic device, comprising: at least one processor and a memory;

the memory stores a computer execution instruction;

the at least one processor executes the computer execution instruction stored in the memory, so that the at least one processor executes the video information display method according to the first aspect and various possible designs of the first aspect.

In a fourth aspect, according to one or more embodiments of the present disclosure, a computer readable storage medium is provided. The computer readable storage medium stores a computer execution instruction. When a processor executes the computer execution instruction, the video information display method according to the first aspect and various possible designs of the first aspect is implemented.

In a fifth aspect, according to one or more embodiments of the present disclosure, a computer program product is provided, which comprises a computer execution instruction. When a processor executes the computer execution instruction, the video information display method according to the first aspect and various possible designs of the first aspect is implemented.

In a sixth aspect, an embodiment of the present disclosure provides a computer program. When being executed by a processor, the computer program implements the video information display method according to the first aspect and various possible designs of the first aspect.

Embodiments of the present disclosure provides a method, a device for video information display, a storage medium and a program product. The method comprises: receiving a trigger operation for a comment control in a video playback interface; and in response to the trigger operation, displaying an information display panel, wherein the information display panel displays a first tab and a second tab, the first tab being associated with video comment information of a currently played video, and the second tab being associated with video related object information about the currently played video. In embodiment of the present disclosure, the first tab and the second tab are displayed in the information display panel of the video playback interface, the first tab being associated with video comment information about the currently played video, and the second tab being associated with video related object information about the currently played video. It is convenient for the user to view the video comment information and the video related object information in the process of watching the video. It is unnecessary to jump to a page of a video related object to view information about the video related object, thereby simplifying user operations. Thus, the user experience is improved.

The foregoing description is merely illustrative of the preferred embodiments of the present disclosure and of the technical principles applied thereto, as will be appreciated by those skilled in the art. The disclosure of the present disclosure is not limited to the technical solution formed by the specific combination of the described technical features. At the same time, it should also cover other technical solutions formed by any combination of the described technical features or equivalent features thereof without departing from the described disclosed concept. For example, the above features and technical features having similar functions disclosed in the present disclosure (but not limited thereto) are replaced with each other to form a technical solution.

In addition, while operations are depicted in a particular order, this should not be understood as requiring that the operations be performed in the particular order shown or in sequential order. Multitasking and parallel processing may be advantageous in certain circumstances. Likewise, while several specific implementation details are included in the above discussion, these should not be construed as limiting the scope of the present disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

What is claimed is:

1. A method for video information display, comprising:

receiving a trigger operation for a comment control in a video playback interface;

in response to the trigger operation, displaying an information display panel, wherein the information display panel comprises a first tab corresponding to a first tab page configured to display comments on a currently played video;

displaying a second tab in the information display panel in response to determining that a product exists in the currently played video, wherein the second tab corresponds to a second tab page configured to display evaluations of the product; and displaying the second tab page in an expanded manner in response to determining that a number of evaluations of the product is greater than a number of the comments on the currently played video.

2. The method of claim 1, wherein the information display panel displays the comments on the currently played video or the evaluations of the product, the first tab associated with the comments on the currently played video or the second tab associated with the evaluations of the product being in a highlighted state.

3. The method of claim 1, further comprising:

acquiring the number of the comments on the currently played video and the number of evaluations of the product, respectively;

determining a tab page to be expanded and a tab page to be hidden based on the number of the comments on the currently played video and the number of evaluations of the product, wherein a tab page is the first tab page corresponding to the first tab or the second tab page corresponding to the second tab in the information display panel; and hidden displaying the tab page to be hidden in the information presentation panel, expanding to display the tab page to be expanded, and displaying corresponding information in the tab page to be expanded.

4. The method of claim 3, wherein the determining a tab page to be expanded and a tab page to be hidden comprises:

in response to one of the number of the comments on the currently played video and the number of evaluations of the product is 0, determining the tab page corresponding to the number being 0 as the tab page to be hidden, and determining the tab page corresponding to the other as the tab to be expanded.

5. The method of claim 1, further comprising:

in response to a tab page switching operation, hiding a currently opened tab page, and opening one or more tab pages of currently hidden tab pages.

6. The method of claim 1, further comprising:

in response to a plurality of products exist in the currently played video, displaying identifications of the plurality of products in the information display panel; and in response to a triggering operation on an identification of a target product, displaying information about the target product in the information display panel.

7. An electronic device comprising: at least one processor and a memory; the memory stores computer execution instructions; when the computer execution instructions stored in the memory being executed by the at least one processor, causing the at least one processor to execute operations comprising:

receiving a trigger operation for a comment control in a video playback interface;

in response to the trigger operation, displaying an information display panel, wherein the information display panel comprises a first tab corresponding to a first tab page configured to display comments on a currently played video;

displaying a second tab in the information display panel in response to determining that a product exists in the currently played video, wherein the second tab corresponds to a second tab page configured to display evaluations of the product; and displaying the second tab page in an expanded manner in response to determining that a number of evaluations of the product is greater than a number of the comments on the currently played video.

8. A non-transitory computer readable storage medium storing computer execution instructions, which when being executed by a processor, cause the processor to implement operations comprising:

receiving a trigger operation for a comment control in a video playback interface;

in response to the trigger operation, displaying an information display panel, wherein the information display panel comprises a first tab corresponding to a first tab page configured to display comments on a currently played video;

displaying a second tab in the information display panel in response to determining that a product exists in the currently played video, wherein the second tab corresponds to a second tab page configured to display evaluations of the product; and displaying the second tab page in an expanded manner in response to determining that a number of evaluations of the product is greater than a number of the comments on the currently played video.

9. The electronic device of claim 7, wherein the information display panel displays the comments on the currently played video or the evaluations of the product, the first tab associated with the comments on the currently played video or the second tab associated with the evaluations of the product being in a highlighted state.

10. The electronic device of claim 7, wherein the operations further comprise:

acquiring the number of the comments on the currently played video and the number of evaluations of the product respectively;

determining a tab page to be expanded and a tab page to be hidden based on the number of the comments on the currently played video and the number of evaluations of the product, wherein a tab page is the first tab page corresponding to the first tab or the second tab page corresponding to the second tab in the information display panel; and hidden displaying the tab page to be hidden in the information presentation panel, expanding to display the tab page to be expanded, and displaying corresponding information in the tab page to be expanded.

11. The electronic device of claim 10, wherein the determining a tab page to be expanded and a tab page to be hidden comprises:

in response to one of the number of the comments on the currently played video and the number of evaluations of the product is 0, determining the tab page corresponding to the number being 0 as the tab page to be hidden, and determining the tab page corresponding to the other as the tab to be expanded.

12. The electronic device of claim 7, wherein the operations further comprise:

in response to a tab page switching operation, hiding a currently opened tab page, and opening one or more tab pages of currently hidden tab pages.

13. The electronic device of claim 7, wherein the operations further comprise:

in response to a plurality of products exist in the currently played video, displaying identifications of the plurality of products in the information display panel; and in response to a triggering operation on an identification of a target product, displaying information about the target product in the information display panel.

14. The non-transitory computer readable storage medium of claim 8, wherein the information display panel displays the comments on the currently played video or the evaluations of the product, the first tab associated with the comments on the currently played video or the second tab associated with the evaluations of the product being in a highlighted state.

15. The non-transitory computer readable storage medium of claim 8, wherein the operations further comprise:

acquiring the number of the comments on the currently played video and the number of evaluations of the product, respectively;

determining a tab page to be expanded and a tab page to be hidden based on the number of the comments on the currently played video and the number of evaluations of the product, wherein a tab page is the first tab page corresponding to the first tab or the second tab page corresponding to the second tab in the information display panel; and hidden displaying the tab page to be hidden in the information presentation panel, expanding to display the tab page to be expanded, and displaying corresponding information in the tab page to be expanded.

16. The non-transitory computer readable storage medium of claim 15, wherein the determining a tab page to be expanded and a tab page to be hidden comprises:

in response to one of the number of the comments on the currently played video and the number of evaluations of the product is 0, determining the tab page corresponding to the number being 0 as the tab page to be hidden, and determining the tab page corresponding to the other as the tab to be expanded.

17. The non-transitory computer readable storage medium of claim 8, wherein the operations further comprise:

in response to a tab page switching operation, hiding a currently opened tab page, and opening one or more tab pages of currently hidden tab pages.

18. The non-transitory computer readable storage medium of claim 8, wherein the operations further comprise:

in response to a plurality of products exist in the currently played video, displaying identifications of the plurality of products in the information display panel; and in response to a triggering operation on an identification of a target product, displaying information about the target product in the information display panel.

* * * * *